United States Patent
Reynolds et al.

(10) Patent No.: US 12,182,118 B1
(45) Date of Patent: Dec. 31, 2024

(54) BOOST CACHE FOR SQL QUERIES WITH WRITE ORDER CONSISTENCY, DATA RACE MANAGEMENT, PARTIALLY MATERIALIZED VIEWS FOR RANGE QUERIES, AND ARBITRARY FILTER EXPRESSIONS

(71) Applicant: PlanetScale, Inc., Mountain View, CA (US)

(72) Inventors: Patrick A. Reynolds, Chapel Hill, NC (US); Dirkjan Bussink, Amsterdam (NL); Vicent Martí, Madrid (ES)

(73) Assignee: PlanetScale, Inc., Mountain View, CA (US)

( * ) Notice: Subject to any disclaimer, the term of this patent is extended or adjusted under 35 U.S.C. 154(b) by 0 days.

(21) Appl. No.: 18/370,393

(22) Filed: Sep. 19, 2023

Related U.S. Application Data

(60) Provisional application No. 63/535,989, filed on Aug. 31, 2023, provisional application No. 63/408,010, filed on Sep. 19, 2022.

(51) Int. Cl.
*G06F 16/2453* (2019.01)
*G06F 16/215* (2019.01)
*G06F 16/2455* (2019.01)

(52) U.S. Cl.
CPC ...... *G06F 16/24539* (2019.01); *G06F 16/215* (2019.01); *G06F 16/24552* (2019.01)

(58) Field of Classification Search
None
See application file for complete search history.

(56) References Cited

U.S. PATENT DOCUMENTS

| | | | |
|---|---|---|---|
| 8,849,825 B1 * | 9/2014 | McHugh | G06F 16/2255 707/737 |
| 11,893,358 B1 * | 2/2024 | Lakshmikanthan | G06F 16/3329 |

(Continued)

OTHER PUBLICATIONS

Gjengset, Jon Ferdinand Ronge; Partial State in Dataflow-Based Materialized Views; Submitted to the Department of Electrical Engineering and Computer Science in Partial Fulfillment of the Requirements for the Degree of Doctor of Philosophy at the Massachusetts Institute of Technology; Feb. 2021.

*Primary Examiner* — Christopher J Raab
(74) *Attorney, Agent, or Firm* — Brill Law Office; Jeffrey Brill

(57) ABSTRACT

Data races are resolved and rows are deduplicated between upqueries and updates to an underlying database, in a database caching layer on top of the underlying database. The caching layer maintains a dataflow graph of nodes representing row data of the underlying database, database operators, and partially or fully materialized queries, wherein queries that use common row data and/or database operators share corresponding nodes. A data race resolution and row deduplication algorithm may be applied on every node that contains a partial materialization, and is correct regardless of how many times this node is reused throughout the dataflow graph. It prevents any of the nodes from seeing duplicated packets between the external upqueries that are originated from each node and any underlying database change events which the node observes. It does so by tagging the records in change events with unique identifiers for the paths in the graph that have seen them before, and by delaying any of the change events that could conflict with any existing in-flight external upqueries.

3 Claims, 4 Drawing Sheets

(56) References Cited

U.S. PATENT DOCUMENTS

2015/0347547 A1* 12/2015 Kasheff ............... G06F 11/1471
707/703
2019/0171650 A1* 6/2019 Botev ................. G06F 16/2358
2019/0235974 A1* 8/2019 Pardon ................ G06F 11/2094

* cited by examiner

BOOST CACHE FOR SQL QUERIES WITH WRITE ORDER CONSISTENCY, DATA RACE MANAGEMENT, PARTIALLY MATERIALIZED VIEWS FOR RANGE QUERIES, AND ARBITRARY FILTER EXPRESSIONS

CROSS-REFERENCE TO RELATED APPLICATIONS

This patent application claims the benefit under 35 U.S.C. § 119(e) of U.S. Provisional Patent Application Ser. No. 63/408,010, entitled "Boost Cache for SQL Queries with Write Order Consistency," filed on Sep. 19, 2022. This patent application claims the benefit under 35 U.S.C. § 119(e) of U.S. Provisional Patent Application Ser. No. 63/535,989, entitled "Boost Cache for SQL Queries with Write Order Consistency, Data Race Management, Partially Materialized Views for Range Queries, and Arbitrary Filter Expressions," filed on Aug. 31, 2023. The entire contents of both provisional applications 63/408,010 and 63/535,989 are incorporated herein by reference.

SUMMARY

Boost is a cache for SQL queries, implemented as a partial materialized view of underlying table data. It may receive data from two sources: by performing read-through queries referred to herein as upqueries, and by subscribing to an update stream consisting of row writes to the underlying database table. Queries and replication are both asynchronous, and there may be multiple queries executing at once. Only a subset of rows in the underlying table will be in Boost's cache, due to cold misses (rows that have not been read through) and capacity misses (rows that have been evicted to make space for more important rows). Boost only stores data in response to read queries; most row writes are ignored.

It is to be understood that Boost is not a standalone database system, but instead a supplementary distributed system that acts as a caching layer on top of an existing database. In one implementation, the existing database is a full Vitess cluster. In this implementation, Boost may be implemented as a Go service in the Vitess codebase. As a cache, Boost does not keep its own data. Instead, it has the underlying MySQL shards of the Vitess cluster as an authoritative source of truth. In a Boost instance, row data present in the MySQL shards of the Vitess cluster are abstracted as an object referred to herein as an External Base. It is to be understood that although Boost is described herein in the context of Vitess, in other implementations Boost can be utilized in conjunction with other databases environments, including other solutions for managing large clusters of database instances.

As noted above, the cache needs to be kept up to date. Writes into a Vitess cluster do not go through Boost—only reads do, so to stay updated Boost may subscribe to the VStream of the cluster as noted above (this is, an aggregation of the binary logs of all the MySQL instances in the cluster). This subscription allows Boost to witness changes to the underlying data, with some latency, and to interpret them to keep the cached data up to date. However, this introduces a complex data race, a solution to which is described in detail below, according to one implementation.

It is also a challenge to ensure that the data in Boost's cache are eventually consistent. That is, regardless of the order that query and replication messages are received and processed by Boost, every row present in the Boost cache must eventually match the most recent version of the same row written to the underlying table. It is possible for versions of the same row to arrive at Boost out of order, and it is possible for Boost to receive replication updates for rows it doesn't yet know it needs to store. How Boost addresses this challenge is described in detail below, according to one implementation.

In order to function as a SQL-compatible database, Boost may transform individual rows from an External Base into the results of the SQL query that the user has requested. Because Boost is not a database that can be queried by arbitrary SQL queries, but instead a caching layer, Boost is configured to know ahead of time the exact queries that the user will be performing on the database, and based on this information, it creates a dataflow graph: e.g., a tree in which the roots are the External Bases, and the leaves are either fully or partially materialized views that represent each user's specific SQL query (referred to herein as Readers). Between the Bases and the Readers, the dataflow graph contains a series of SQL operators that perform the actual transformations requested by the user (things like aggregating rows, transforming the values of columns, joining them, etc.). A partially materialized view behaves like a fully materialized view, but it contains gaps or missing keys.

The main reason to have a partially materialized view is to minimize the amount of data to be processed and the memory that the view will occupy in the system, as to not actively hold and maintain up-to-date rows that will be rarely read by the user. The partially materialized view may start up being empty, and only acquires data lazily, when the user requests it. Thus, misses occur when a response to a query requires data not yet present in the partially materialized view.

Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Processing Data Acquisition in the Case of Misses

One algorithm to process data acquisition when a user misses during a read to a partial view exploits the fact that the underlying data store is, e.g., a Vitess cluster backed by several MySQL instances. As such, it can actually compute SQL expressions without needing to replay data. This algorithm follows:

Step 1—When a query misses on a Reader, instead of falling back to the first immediate parent with a partial materialization, Boost falls back to the last one. That is, Boost targets the first partially materialized node in the dataflow when walking from the External Base.

Step 2—This node, just like all the other nodes with state in the graph, has been extended with an external upquery for the node, calculated at plan time. This means that the Boost planner, after decomposing all the SQL primitives in the original query into individual operators for the dataflow, also extends each operator with its reverse-equivalent SQL expression.

Step 3—To fill the miss on the target node, Boost performs the reverse-equivalent SQL expression for the operator in our upstream database. This can be done by using Vitess' internal routing logic (the same logic that can be found inside a VTGate) to route the complex SQL across shards.

Step 4—The results of this query are not considered a replay, as they do not contain individual rows to be forwarded through the dataflow operator. Instead, these results are specifically tagged so that they fill the state in the target node by being inserted directly into its state table, not processed (note that the "processing" that would be performed on the rows of a replay has already been performed by MySQL here).

Step 5—If necessary, once the state has been filled, a replay is triggered to forward the new rows downstream all the way to the Reader.

This algorithm is far more efficient than recursively upquerying nodes in the dataflow graph until the desired data is found, and then triggering a replay to pass the data to the Reader. It is to be understood that in other implementations, variations and/or tunings can be made to this algorithm and/or the application thereof.

Figure 1:
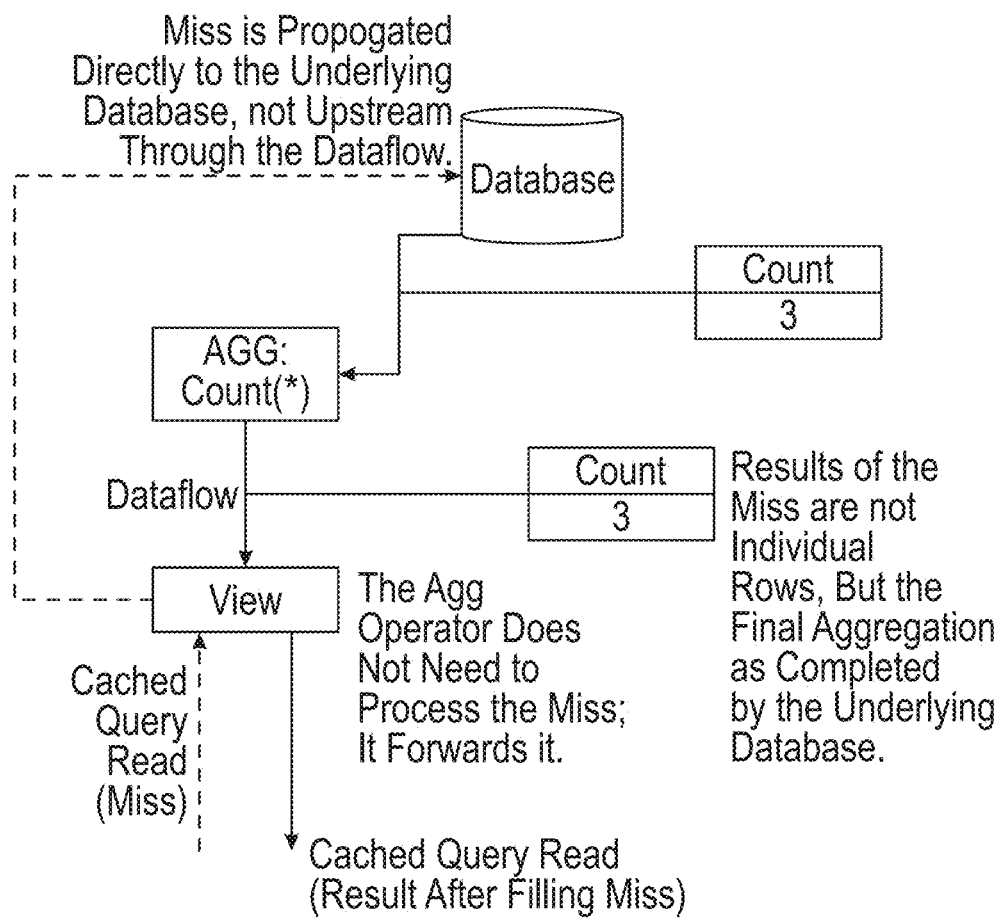
FIG. 1 illustrates a dataflow in Boost when filling a miss for an aggregation, according to one implementation.

Turning to FIG. 1, a dataflow in Boost when filling a miss for an aggregation is illustrated. The final result of the aggregation is flows directly from the underlying database into the aggregation node, which relays it through.

To highlight the importance of Step 4 of the above-described algorithm, let us see the difference between the way recursively upquerying with replay and the above-described algorithm would fill a miss on the example query (SELECT COUNT(*) FROM tbl WHERE tbl.a=?). In recursively upquerying with replay, to fill the miss for value X, the aggregation operator node would receive a replay containing all the rows in tbl where tbl.a=X. Then, it would process each row individually, accumulate their count, and store their count C in its state table. The result C is the single-row, single-column output of the operator, which will then be forwarded through any downstream operators in the dataflow until the miss is filled in the Reader. Hence, the aggregation operator has processed an arbitrary amount of rows, O(n), with the total number of rows in the underlying table.

In contrast, the above-described algorithm would fill the miss by acquiring the reverse equivalent SQL expression for the operator and extending it with a filter by X. In this particular example, the resulting query would be something almost identical to the user's original query (e.g. SELECT COUNT(*) FROM tbl WHERE tbl.a=X), because the dataflow for this query is trivial, but for more complex and nested queries, the reverse-equivalent expression for an operator is usually a subset of the user's original query. The composed query is then performed directly on the Vitess cluster, and the result C is inserted directly into the state table for the operator, and forwarded downstream until it reaches the Reader. Note that the operator has not actually processed the result of the external upquery—the processing has been performed by MySQL, which is why a single row is received as the result, as opposed to N individual rows that must be counted in Boost.

Lastly, also note that the design decision in step 1 is not mandatory: these external upqueries have been implemented on the nearest materialized node from the External Base as a simplification. They could be performed at any height in the dataflow graph, but if the upqueried operator is not directly reachable from the External Base, all the other partially materialized operators above it will not become aware of the fact that new state has been filled downstream, so any updates that arrive through the VStream subscription will be discarded before they can reach the node with the newly filled state, so this state will become stale. This issue can be fixed (e.g. by adding "gaps" to all the upstream operators after receiving the result of the external upquery), but it has been implemented in its simplified form because that covers a large majority of currently known cases. The extended form can be implemented in the case of query patterns where this becomes is desirable.

The external upqueries performed in the middle of the dataflow allow Boost to fill a miss with performance that is at worst equivalent to MySQL computing the query itself, and often much faster. The amount of data transmitted from Vitess to the Boost instance has been cut by orders of magnitude. However, the design introduces new complexity in the aforementioned data race. Solutions to this issue are described in detail below.

Data Races at Any Depth of the Dataflow Graph

It is to be understood that the solution described above for data acquisition in the case of misses allows for upqueries (queries to the external Vitess cluster) to be performed at any depth of the dataflow, not only to the External Bases. If a system were to only upquery External Bases in the case of misses, the system would always have to fetch ranges of individual rows from the underlying Base table, and the results of the original upqueries would always be replays. By contrast, because Boost can perform upqueries on arbitrary SQL operators, the results are not replays, because they contain the final results that need to be stored in the state tables, not the individual rows that must be processed by the operator. And yet these results are also vulnerable to the same data race between VStream changes and upquery rows as discussed above.

To address the data race issue, keep in mind that requests to the underlying Vitess cluster can be performed on any partially materialized operator throughout the dataflow graph, so filtering incoming change events cannot be performed only in the External Base. It is performed separately on each operator that can perform an external query.

Although the graph of Bases, Readers and SQL operators has been discussed above as a tree (with a set of roots and leaves), in production environments it often looks more like a Directed Acyclic Graph (DAG), because individual nodes can be reused by more than one query.

A ready example of this are External Bases. In a Boost instance that is caching more than one query, and these queries depend on the same underlying SQL table, the dataflow will contain only one External Base that represents the given SQL table, and this node will be shared by the dataflow of two or more queries. This generalizes to any other SQL operator throughout the dataflow. Boost queries may share common patterns, or subqueries can be efficiently cached by reusing parts of the dataflow, as to prevent the same partial state from being materialized more than once. This is a very powerful optimization in practice, but it complicates the algorithm to deduplicate rows between upqueries and VStream changes.

When analyzing the dataflow graph as a DAG, it becomes apparent that a VStream change event that arrives through a specific External Base must be fanned out to all the children of this external base (which, as noted above, can be more than one because of node reuse), and for each one of those children, the change event must be fanned out again, and so on recursively. The event must be replicated throughout all the branches of the graph, because materialized state can exist on any SQL operator reachable from the External Base.

However, if Boost performs the same DAG analysis for the response of an external upquery (whether the result is a set of rows from an external base, or a final answer from an intermediate SQL operator), the resulting replay from the upquery will only be sent through the single path of the DAG that reaches the initial Reader that originally triggered a miss.

VStream change events need to be seen by all the paths of the DAG. Taking this correctness issue into account, the following algorithm may be used for row deduplication, according to one implementation.

1. We define a GTID Tracker as an auxiliary data structure associated with any node in the dataflow graph that keeps partially materialized state. This applies to both External Bases and SQL operator nodes. (A GTID (Global Transaction Identifier) provides a way to uniquely identify and track transactions across a distributed database environment. Each server assigns a unique GTID to every transaction, such that subsequent GTIDs are incremented and order of transactions may be tracked.)

2. Every GTID Tracker tracks separately the recently seen upqueries for every path of the DAG that traverses the specific node. These paths are uniquely identified by a Tag, a strictly increasing identifier generated by our query planner.

3. When an upquery is triggered from a Reader, the upquery is marked with its corresponding Tag, again identifying the unique path through the DAG that the results of the upquery will traverse to arrive to the Reader.

4. If the upquery targets an External Base, or a partially materialized node directly reachable from an External base (this is, if the upquery will be resolved as an external upquery by reaching out to the underlying Vitess cluster), we store a record in the GTID tracker for the node. This record is global for the tracker (i.e. shared between all the separate replay paths that are tracked) and contains the primary key that was requested for the external upquery.

5. When the upquery is finished, before we process its results:

i. We access the Tag-scoped tracker inside the GTID Tracker for the node where the upquery was performed. We know the specific Tag because both the original upquery and its results are marked with a Tag, since the Tag represents the unique path through the DAG that the results of the upquery will traverse.

ii. For every record in the result of the external upquery, we store it in the set of recently seen upqueries for that Tag. We store the primary key that uniquely identifies the record, and the GTID that the underlying database returned for the record. In our case, the underlying database is a Vitess cluster and the GTID is a MySQL Global Transaction Identifier, but this can be generalized to any GTID-like value (i.e. a strictly-increasing counter or timestamp that allows us to compare whether a record comes before or after another record in time).

iii. We access the global set of in-flight queries for the GTID Tracker (this is not Tag-scoped).

iv. We remove this upquery from the set of in-flight queries. If the in-flight record had any buffered VStream change events accumulated in it (see item 6.iii, below), we yield those events. They will be forwarded through the dataflow right after the results of the upquery, so that the records in the events can be checked for recent duplicates.

v. The result of the upquery is forwarded through the dataflow unchanged.

6. Meanwhile, when a VStream change event is processed by the GTID tracker for this node:

i. We iterate through all the records in the change event. For every record, we check if any of the Tag-scoped trackers inside the GTID tracker has recently seen the record. We can efficiently check this by comparing the record's primary key with the primary key we stored in the Tag-scoped tracker.

ii. For every record in the change event that has been recently seen by one of the Tag-scoped trackers, if the previously seen GTID is newer our equal than the GTID for this new record, we mark the record in the change event with the Tag where it was seen before. Unlike in the original version of the algorithm, the record is not removed from the change event—it is simply tagged.

iii. Otherwise, if the record in the change event is a record that could possibly be returned by one of the in-flight upqueries (we can check this because we know the primary key for the in-flight upquery, and we know the primary key for this record): we buffer the full contents of the change event in the inflight set for the GTID tracker. The buffered events will be yielded after the in-flight query is finished, as explained in section 5.iv. Since the VStream change event has been buffered, we will skip processing it right now. It is important to note that this whole check for a VStream change event will be applied again after the buffered contents are yielded, and that this second check cannot trigger buffering again, because there won't be any in-flight misses for the data we've already buffered.

7. Before we process any record in any of the operators of the dataflow graph, we figure out all the Tags that belong to the operator's node (this is, the set of all unique paths through the DAG that cross this specific node—this can be precomputed at plan time). If the record is tagged with any of the node's Tags, we do not process it.

Figure 2:
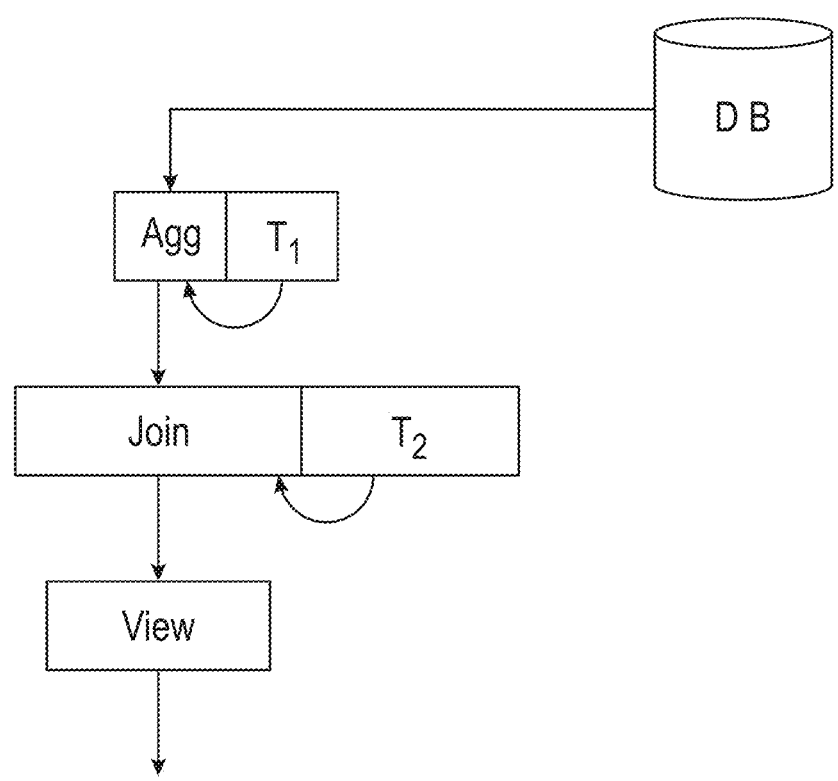
FIG. 2 illustrates a use case in which GTID tracking is implemented at every level of the dataflow and handles incoming data from the underlying database, according to one implementation.

Turning to FIG. 2, a use case is illustrated in which GTID tracking is implemented at every level of the dataflow and handles incoming data from the underlying database.

According to one implementation, this algorithm is applied on every node that contains a partial materialization, and is correct regardless of how many times this node is reused throughout the dataflow graph. It prevents any of the nodes from seeing duplicated packets between the external upqueries that are originated from each node and any VStream change events which the node observes. It does so by tagging the records in VStream change events with unique identifiers for the paths in the DAG that have seen them before, and by delaying any of the VStream change events that could conflict with any existing in-flight external upqueries. This delay or buffering is pessimistic (it can delay events that won't conflict in practice) but conservative (in practice, it delays a small subset of all the VStream change events that flow through the node). It is to be understood that in other implementations, variations and/or tunings can be made to this algorithm and/or the application thereof.

Partially Materialized Views for Range Queries

So far, Readers have been discussed, the nodes where the output of the dataflow is partially materialized, as a hash table. The above-described implementations of Readers allows Boost to fill misses for point queries (i.e., queries where the filter is an equality operator, such as WHERE tbl.a=?) by storing the query parameter as the key to the hash table and three possible states as the value:

The actual rows that are the result of the query, if they've been materialized

An empty placeholder ("hole"), if the result of the query would return no rows when performed on the underlying data store Nothing (i.e. no entry in the hash table) if we don't know the result of the query because it has never been backfilled from the underlying data store.

A conventional mechanism exists for partial materialization of point queries (that is, queries that select individual rows with equality or "in" operators). Here, we describe an extension to allow the dataflow engine to partially materialize range queries (that is, queries with the >, >=, < and <=operators). As with a traditional storage engine for a database, in order to serve range queries, the underlying data structure must be ordered. For one implementation of this extension in Boost, a B-Tree is used, although other data structures (e.g., binary tree, skip list, B+ tree, etc.) may be used similarly in other implementations. The ordered data structure allows Boost to serve a range query (e.g., WHERE tbl.a>=? AND tbl.a<?) by scanning all the entries in the tree between the two boundaries. A problem, exclusive to Boost, and which we've solved in a novel way described below, is the partial materialization of rows and holes in the B-tree. When a query is performed on a Boost cluster and the partially materialized view must now be queried by a range (i.e., a lower bound, an upper bound, or both), how could it be known if any of the data in the range is missing from the underlying data store, or whether it's not missing but we've never fetched it yet?

For a point query, this issue is solved by performing an upquery for the exact key that was missing, and storing in that key's slot in the hash table either the resulting rows, or a hole if there were no results. For a range query, Boost would upquery a whole range of values, but after storing them in the B-tree, how would subsequent user queries to non-equal but overlapping ranges know whether any data is missing or just hasn't been fetched yet?

A possible solution to this issue is using an interval tree to track the ranges of the partially materialized view which have been filled. This is very accurate, although it has the drawback of propagating throughout the whole system: it's not enough to use an interval tree to track seen ranges in the Reader. All the other operator nodes in the dataflow must similarly keep their own interval tree to track misses on their intermediate state. This adds a significant amount of complexity to the system.

In one implementation Boost solves the issue using a more efficient design to work around this problem by introducing a constraint on the kind of range queries that can be partially materialized: they need to have at least one equality operator in their filter conditions, besides an arbitrary amount of range operators. Hence, a query such as WHERE tbl.a=? AND tbl.b>=? AND tbl.c>? could be partially materialized. A query such as WHERE tbl.a>? and tbl.b>=? could not be partially materialized by this system, although we do support it in practice by performing full materialization, like a traditional materialization engine would.

By introducing this restriction, we scope down the complexity of keeping track of holes: we can return to a system very similar to the one we're using for tracking holes for point queries by augmenting our ordered data store (a B-tree) with an auxiliary data structure that keeps tracks of which roots of the B-tree are holes. Here, roots means the prefix of the partial materialization key that applies to equality operators. With this approach, a query such as WHERE tbl.a=? AND tbl.b>? would only check whether tbl.a=? has been filled before by looking up the prefix for tbl.b in the auxiliary data structure. If found, it means that the B-tree contains a comprehensive view of the underlying data store for all the values where tbl.a=?, and hence can be queried with a range starting at tbl.b>?. If missing, the upquery we generate is scoped down to tbl.a=?. Our goal is filling up a whole sub-tree of the partially materialized view, that will be processed by all the upstream dataflow operators without them needing to be aware of the fact that the view will be processing a whole range of values. From the operators' point of view, they're still processing a miss for a single point query.

This design was much more efficient to implement compared to using interval trees throughout the dataflow, and provides very good real world performance characteristics. Even in pathological cases, such as where the equality filter in the query is for a column with very few unique values (causing the sub-tree that is being fetched to be very large), the system degrades into the equivalent of a fully materialized view. In common queries, which frequently have two or more equality operators as filter conditions, the amount of data fetched on each sub-tree is very similar to the theoretical minimum (i.e., what would be fetched if holes were being tracked by a interval tree).

Figure 3:
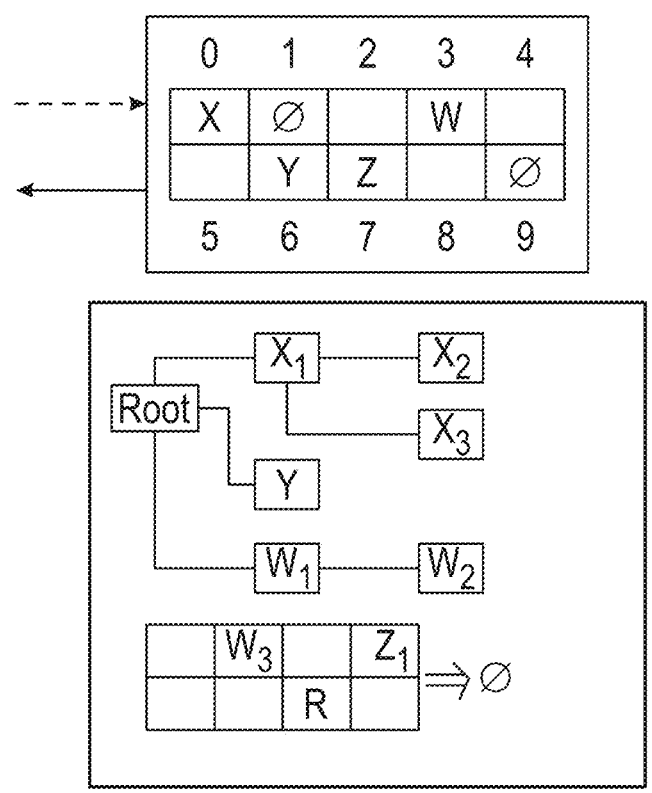
FIG. 3 illustrates an example view for a point query, implemented as a Hash Table, where holes are explicitly marked as such, according to one implementation.

Turning now to FIG. 3, an example view is illustrated for a point query, implemented as a Hash Table, where holes are explicitly marked as such. Below, an example view for a range query, where the B-Tree data structure tracks the individual values for the query while a separate Hash Table explicitly tracks the holes for all the prefixes.

Arbitrary Filter Expressions

Lastly, a novel design is described for a dataflow engine that supports arbitrary filtering expressions with placeholders. The above-described design supports arbitrary filtering expressions as long as they don't have placeholders. Any SQL filter expression such as WHERE tbl.b NOT IN ('foo', 'bar', 'baz') can be evaluated as part of the dataflow as long as the right-hand side of the expression is constant. When the right hand is a placeholder from the user's query (e.g., WHERE tbl.b=?), these expressions must be lifted outside of the dataflow: they act as the indexing key on which we query the partially materialized view. With the above-described design, our partially materialized view can be queried by any equality expression and by any range expression, as long as it is accompanied by at least one equality expression.

The design described now further allows the support of any SQL filter expression by paying a small performance penalty. To accomplish this, an algorithm is presented for defining the indexing key of our partially materialized view that splits the indexing between direct indexing and post-indexing. This means that, given a set of arbitrary filter expressions with placeholders, we split the set between:

- The set of filter expressions that can be composed to create an indexing key into the partially materialized view
- The set of filter expressions that can only be applied as a post-processing step at query time The logic of the algorithm is as follows: To construct the indexing key, 1. Append all the filter parameters with an equality (=) operator, regardless of order
2. Group all the range parameters based on the column they're filtering
3. Append the parameters for the largest group
4. Append all other parameters to the post-filtering step.

It is to be understood that in other implementations, variations and/or tunings can be made to this algorithm and/or the application thereof.

We now walk through an example implementation using the algorithm described above. For a complex query such as WHERE tbl.a>? AND tbl.b=? and tbl.a<=? AND tbl.c IN (?) AND tbl.d LIKE?, our algorithm selects the subset of filtering expressions that can be used to create an index into the partially materialized view. In this case, that would be tbl.a>? and tbl.b=? AND tbl.a<=?, and the resulting index would be [b, a], with queries ranging from [b, a_lower] to [b, a_upper] in an ordered data store. The remaining filter operations, tbl.c IN (?) AND tbl.d LIKE?, will be applied at query time.

With this approach, we split the dataflow in two phases: the traditional dataflow that we previously described, that results in a partially materialized view, and a query-time dataflow step that is performed on the subset of results that are returned from the partially materialized view. By creating a broader materialized view, we have a slightly less efficient cache that supports any arbitrary filtering expression by paying a performance cost of delaying part of the dataflow operators at query time.

Figure 4:
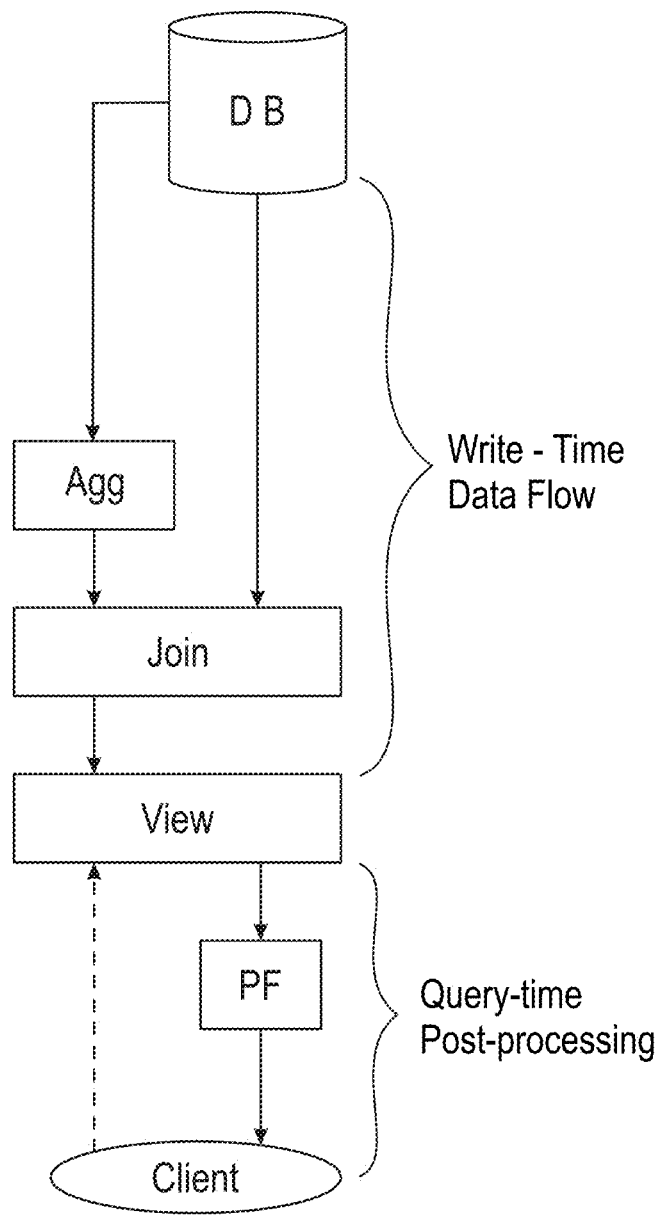
FIG. 4 illustrates a dataflow of a query split between write-time dataflow and query-time dataflow with post-processing of a query, according to one implementation.

FIG. 4 illustrates a dataflow of a query split between write-time dataflow and query-time dataflow with post-processing of the query shown below. The query includes a repository.name NOT IN (?) filter that cannot be processed as part of the dataflow. Hence, such filter is applied at query time in the post-processing filter PF.

The query of FIG. 4:
SELECT repository.id, repository.owner_id, repository.name, starcount.stars FROM repository
LEFT JOIN (SELECT star.repository_id, COUNT(star.user_id) AS stars FROM star GROUP BY star.repository_id) AS starcount ON (repository.id=starcount.repository_id)
WHERE repository.id=? AND repository.name NOT IN (?);

The query-time dataflow step is defined as a set of operations performed at query time based on the output of a broader partially materialized result set and the parameters the user has supplied. These operations are implemented using the same primitives as the dataflow, to ensure results are consistent, and they have two phases: filtering and aggregation.

The filtering phase is applied to all queries with post-indexing. It filters out all the rows that have been fetched from the materialized view and that do not match the post filters, by evaluating the filtering expressions using the user's placeholders. For instance, for a query such as SELECT tbl.* FROM tbl WHERE tbl.a=? AND tbl.b NOT IN (?), the result of the partially materialized view are all the rows where tbl.a equals the user's first placeholder, and this result is further filtered down by applying the tbl.b NOT IN(?) expression with the user's second placeholder.

The aggregation phase is applied to those queries that have post-indexing and whose select statement contains aggregated functions (e.g. COUNT, SUM, MIN, MAX, etc.). This is required in some implementations because these queries must materialized into result sets that are broader than the user expects (this is seen in the previous filtering example), and they also have a higher cardinality, to take into account the values for the filter expressions that were not part of the partial materialization key. This is a novel and important part of the post-filtering implementation, because it requires changes on the dataflow for the query.

Let us see an example. For an aggregation query such as SELECT COUNT(*) FROM tbl WHERE tbl.a=? AND tbl.b NOT IN (?), where one of the filter operators cannot be used as a key into the partially materialized view, the trivial materialization of the query would not work for applying a post processing step. If one simply uses SELECT COUNT (*) WHERE tbl.a=? as the broader query that will be materialized, there is no way to apply WHERE tbl.b NOT IN (?) at query time, because the values for tbl.b have been collapsed into the aggregation. To support these cases, our dataflow query planner must be extended to push down all the data dependencies for post-filtering operators all the way to the view. Hence, the broader query that is partially materialized here would be SELECT COUNT(*), tbl.b from tbl WHERE tbl.a=? GROUP BY tbl.b. The result set for the placeholder can now be filtered on tbl.b NOT IN (?) in the post-indexing filtering phase previously described, because tbl.b is now part of the returned rows. However, simply applying the filtering operation on the returned rows at query time is not sufficient to generate the correct result. The output of a COUNT(*) operation must be a single row, and we have a range of rows, grouped by b, that must be aggregated again.

In the described implementation, this aggregation operator is implemented using the same primitives as the aggregation nodes in the dataflow, and performs the correct supra-aggregation for each operator kind: COUNT s are summed (not counted again), SUM s are summed again, and MAX and MIN are re-applied to find the maximum/minimum out of all the partial maximums/minimums.

CONCLUSION

The architecture described herein exploits the functionality of the underlying Vitess cluster and MySQL instances to move a lot of expensive computation away from the Boost cache. Performing external upqueries at any depth of the dataflow graph and resolving duplication in any of the nodes that can perform an external upquery are implemented by applying novel algorithms. With the addition of partially materialized range queries and post-filtering operators, the new architecture described herein supports a wide array of SQL patterns, without having pathological performance cases during misses, and without suffering any correctness issues due to duplicated data.

It is to be understood that although Boost is often referred to herein as a discrete entity, as used herein the name Boost refers to a collection of functionalities, which can be instantiated as a single or multiple modules, programs, processes, executable images and the like, on one or more computing devices as desired. It is to be understood that the functionalities of Boost can be instantiated (for example as object code or executable images) within the system memory (e.g., RAM, ROM, flash memory) of any computer system, such that when the processor of the computer system processes a module, the computer system executes the associated functionality. As used herein, the terms "computer system," "computer," "client," "client computer," "server," "server computer" and "computing device" mean one or more computers configured and/or programmed to execute the described functionality. Additionally, program code to implement the functionalities of Boost can be stored on computer-readable storage media. Any form of tangible computer readable storage medium can be used in this context, such as magnetic or optical storage media. As used herein, the term "computer-readable storage medium" does not mean an electrical signal separate from an underlying physical medium.

As will be understood by those familiar with the art, the subject matter described herein may be embodied in other specific forms without departing from the spirit or integral characteristics thereof. Likewise, the particular naming and division of the portions, modules, agents, managers, components, functions, procedures, actions, layers, features, attributes, methodologies, data structures and other aspects are not mandatory or significant, and the entities used that implement the subject matter described herein may have different names, divisions and/or formats. The foregoing description, for purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the functions indicated by blocks. The structure for a variety of these systems will appear from the description above. In addition, the specification is not described with reference to any particular programming language. It will be appreciated that a variety of programming languages may be used to implement the teachings of the specification as described herein.

Accordingly, the disclosure is intended to be illustrative, but not limiting.

What is claimed is:

1. A computer implemented method for resolving data races and deduplicating rows between upqueries and updates to an underlying database, in a database caching layer on top of the underlying database, the method comprising:

maintaining, by the caching layer, a dataflow graph, nodes of the dataflow graph representing row data of the underlying database, database operators, and partially or fully materialized queries, wherein the row data nodes are roots, the query nodes are children, and database operator nodes are between data row nodes and corresponding ones of the query nodes, wherein queries that use common row data and/or database operators share corresponding nodes;

defining a separate Global Transaction Identifier ("GTID") tracker as an auxiliary data structure associated with each specific node in the dataflow graph with a partially materialized state;

separately tag-scope tracking, by each GTID tracker, upqueries occurring within a requisite period of time, for every path of the dataflow graph that traverses the corresponding specific node, such that each GTID tracker is associated with a corresponding tag-scope tracker;

responsive to an upquery being triggered from a query node, marking the upquery, by a corresponding GTID tracker of the triggering query node, with a corresponding tag in the tag-scope tracker of the corresponding GTID tracker, the tag identifying a unique path through the dataflow graph that the results of the upquery traverse to arrive to the triggering query node;

responsive to an upquery that results in access of the underlying database in order to be resolved, storing a corresponding record in the GTID tracker of the triggering query node, the corresponding record being shared between all separate replay paths that are tracked, and containing data that was requested from the underlying database for the upquery;

upon completion of the upquery, before processing the results of the upquery:

accessing the tag-scoped tracker of the GTID tracker of the triggering query node, and identifying a specific tag representing a unique path through the dataflow graph that the results of the upquery traverse;

storing every specific record in the result of the upquery in a set of upqueries tracked within a requisite period of time for the specific tag, including a primary key that uniquely identifies the specific record, and the GTID that the underlying database returned for the specific record;

accessing a global set of in-flight queries for the GTID tracker;

removing the upquery from the set of in-flight queries;

responsive to a current record in the result of the upquery having at least one accumulated buffered underlying database change event, yielding the at least one buffered underlying database change event; and forwarding results of the upquery, unchanged, through the dataflow graph;

processing an underlying database change event by the GTID tracker for the triggering query node by performing the following steps:

responsive to an underlying database change event being processed by the GTID tracker for the triggering query node, iterating through all the records in the change event;

for each specific record in the change event, determining whether any corresponding tag-scoped tracker has tracked the specific record within a requisite period of time;

for each specific new record in the change event that has been tracked by corresponding tag-scoped tracker within the requisite period of time, responsive to the previously tracked GTID being newer than or our equal to the GTID for the specific new record, tagging the specific new record in the change event with the tag with which it was tracked before; and for each specific new record in the change event that has been tracked by tag-scoped tracker within the requisite period of time, responsive to the previously tracked GTID being older than the GTID for the specific new record, if the specific new record in the change event is a new record that could have been returned by one of the in-flight upqueries, buffering the full contents of the change event in the inflight set for the GTID tracker, such that buffered events will be yielded after a current query is finished;

prior to processing any record in a given one the database operator nodes of the dataflow graph, determining each specific tag that belongs to the given database operator node; and processing only records that are not tagged with any of the specific tags of the given database operator node.

2. The method of claim 1 wherein the underlying database further comprises a Vitess cluster.

3. The method of claim 1 wherein and each GTID further comprises is a MySQL Global Transaction Identifier.

* * * * *